United States Patent
Guo

(10) Patent No.: US 12,550,007 B2
(45) Date of Patent: Feb. 10, 2026

(54) NETWORK SWITCHING METHOD AND APPARATUS, AND TERMINAL DEVICE AND STORAGE MEDIUM

(71) Applicant: ZTE CORPORATION, Shenzhen (CN)

(72) Inventor: Hailin Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 356 days.

(21) Appl. No.: 18/248,914

(22) PCT Filed: Aug. 24, 2021

(86) PCT No.: PCT/CN2021/114344
§ 371 (c)(1),
(2) Date: Apr. 13, 2023

(87) PCT Pub. No.: WO2022/083272
PCT Pub. Date: Apr. 28, 2022

(65) Prior Publication Data
US 2023/0397051 A1 Dec. 7, 2023

(30) Foreign Application Priority Data

Oct. 23, 2020 (CN) .......................... 202011145645.6

(51) Int. Cl.
*H04W 28/20* (2009.01)
*H04L 43/04* (2022.01)

(52) U.S. Cl.
CPC ............. *H04W 28/20* (2013.01); *H04L 43/04* (2013.01)

(58) Field of Classification Search
CPC ..... H04W 28/20; H04W 48/18; H04W 28/16; H04L 43/04; H04L 41/0893
See application file for complete search history.

(56) References Cited

U.S. PATENT DOCUMENTS

| 11,470,657 | B2 | 10/2022 | Youn et al. |
| 2008/0052754 | A1 | 2/2008 | Iga |
| 2019/0253961 | A1* | 8/2019 | Bouvet ................ H04W 48/18 |

(Continued)

FOREIGN PATENT DOCUMENTS

| CN | 109792657 A | 5/2019 |
| CN | 110266545 A | 9/2019 |

(Continued)

OTHER PUBLICATIONS

3GPP Technical Specification Group and System Aspects. "Policy and charging control framework for the 5G System (5GS); Stage 2 (Release 16)," 3GPP TS 23.503, vol. 16.6.0, 2020.

(Continued)

*Primary Examiner* — Christopher M Brandt
(74) *Attorney, Agent, or Firm* — Vivacqua Crane, PLLC

(57) ABSTRACT

A network switching method and apparatus, and a terminal device and a storage medium are disclosed. The method may include: monitoring current network slice information of a terminal device; and switching a current default network of the terminal device from another network to a data network (Continued)

corresponding to a preset network slice, in response to a change of the network slice information to network slice information corresponding to the preset network slice.

20 Claims, 3 Drawing Sheets

(56) References Cited

U.S. PATENT DOCUMENTS

| | | | | |
|---|---|---|---|---|
| 2019/0373526 A1* | 12/2019 | Chow | ............... | H04W 36/14 |
| 2019/0394833 A1 | 12/2019 | Talebi Fard et al. | | |
| 2020/0178196 A1* | 6/2020 | Wang | ............... | H04W 48/18 |
| 2020/0187276 A1 | 6/2020 | Wang et al. | | |
| 2020/0221365 A1* | 7/2020 | Paranjpe | ............... | H04W 40/12 |
| 2021/0099936 A1* | 4/2021 | Gupta | ............... | H04W 80/06 |
| 2022/0201569 A1* | 6/2022 | Horita | ............... | H04W 48/18 |
| 2023/0308363 A1* | 9/2023 | Ishii | ............... | H04W 48/18 |

FOREIGN PATENT DOCUMENTS

| | | |
|---|---|---|
| CN | 110582109 A | 12/2019 |
| JP | 2011070678 A | 4/2011 |
| JP | 2020530690 A | 10/2020 |
| WO | 2018119592 A1 | 7/2018 |
| WO | 2019064383 A1 | 4/2019 |
| WO | 2019139903 A1 | 7/2019 |
| WO | 2019190166 A1 | 10/2019 |

OTHER PUBLICATIONS

European Patent Office. Extended European Search Report for EP Application No. 21881691.6, mailed Mar. 18, 2024, pp. 1-9.

Industrial Property Cooperation Center (IPCC). Search Report for JP Application No. 2023-519561 and English translation, mailed Feb. 27, 2024, pp. 1-32.

Japan Patent Office. Notice of Reasons for Refusal for JP Application No. 2023-519561 and English translation, mailed Mar. 26, 2024, pp. 1-6.

International Searching Authority. International Search Report and Written Opinion for PCT Application No. PCT/CN2021/114344 and English translation, mailed Nov. 9, 2021, pp. 1-10.

The State Intellectual Property Office of People's Republic of China. Second Office Action for CN Application No. 202011145645.6 and English translation, mailed Mar. 7, 2025, pp. 1-10.

The State Intellectual Property Office of People's Republic of China. Second Search Report for CN Application No. 202011145645.6 and English translation, mailed Mar. 4, 2025, pp. 1-4.

The State Intellectual Property Office of People's Republic of China. First Office Action for CN Application No. 202011145645.6 and English translation, mailed Oct. 31, 2024, pp. 1-8.

The State Intellectual Property Office of People's Republic of China. First Search Report for CN Application No. 202011145645.6 and English translation, mailed Oct. 28, 2024, pp. 1-4.

\* cited by examiner

NETWORK SWITCHING METHOD AND APPARATUS, AND TERMINAL DEVICE AND STORAGE MEDIUM

CROSS-REFERENCE TO RELATED APPLICATIONS

This application is a national stage filing under 35 U.S.C. § 371 of international application number PCT/CN2021/114344, filed Aug. 24, 2021, which claims priority to Chinese patent application No. 202011145645.6 filed Oct. 23, 2020. The contents of these applications are incorporated herein by reference in their entirety.

TECHNICAL FIELD

The present disclosure relates to but is not limited to the field of communication, in particular to but not limited to a method and device for network switching, a terminal device, and a storage medium.

BACKGROUND

In the 5G era, smart terminal devices tend to connect to Wi-Fi during switching between Wi-Fi (wireless internet access) and Cellular (cellular technology). As long as the Wi-Fi signal is not too poor and the network connectivity check is passed, the default network of the terminal device will be switched to Wi-Fi. However, with the development of cellular networks, especially the 5G, network slicing is bound to develop rapidly. Operators may launch diversified network slicing services such as network slicing based on specific user groups, network slicing based on specific APPs, network slicing based on specific regions, etc., which will help to provide differentiated services, improve service quality, enhance user experience, and thus gain more commercial benefits. In this case, in some environments, Wi-Fi network no longer has the advantages of signal strength and network transmission speed compared with the cellular network, and the existing network switching strategy does not take into account each network condition, which greatly affects the user experience.

SUMMARY

Provided are a method and device for network switching, a terminal device, and a storage medium in some embodiments of the present disclosure, to at least alleviate the related technical problem.

An embodiment of the present disclosure provides a method for network switching, which may include, monitoring current network slice information of a terminal device; and switching a current default network of the terminal device from another network to a data network corresponding to a preset network slice, in response to a change of the network slice information to network slice information corresponding to the preset network slice.

An embodiment of the present disclosure provides a device for network switching, which may include, a network monitoring module, which is configured to monitor current network slice information of a terminal device; and a network switching module, which is configured to switch a current default network of the terminal device from another network to a data network corresponding to a preset network slice, in response to a change of the network slice information to network slice information corresponding to the preset network slice.

An embodiment of the present disclosure provides a terminal device, which may include, a processor, a memory and a communication bus; where, the communication bus is configured to implement a connection and communication between the processor and the memory; and the memory stores at least one computer program executable by the processor which, when executed by the processor, causes the processor to carry out the method as described above.

An embodiment of the present disclosure provides a computer-readable storage medium storing at least one computer program executable by a processor, which when executed by the processor, causes the processor to carry out the method as described above.

Other features and corresponding beneficial effects of the present disclosure are described in the latter part of the description, and it should be understood that at least part of the beneficial effects will become apparent from the description of the present disclosure.

DETAILED DESCRIPTION

The present disclosure will be described below through some embodiments in conjunction with the drawings, for illustration of the purpose, technical scheme and advantages of the present disclosure. It should be understood that the embodiments described here are illustrative but not limiting.

Embodiment One

Figure 1:
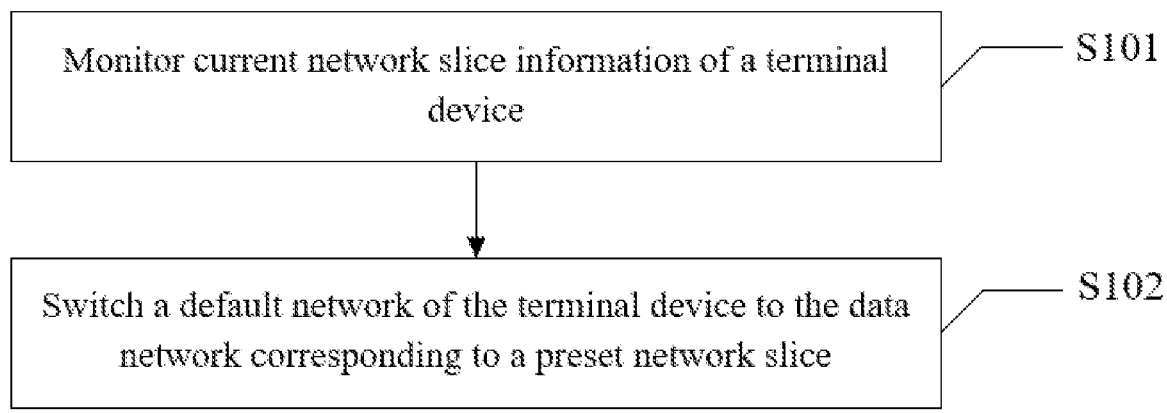
FIG. 1 depicts a flowchart showing a method for network switching according to an embodiment of the present disclosure.

This embodiment provides a method for network switching. Referring to FIG. 1, the method includes the following operations.

At S101, current network slice information of a terminal device is monitored.

At S102, a default network of the terminal device is switched from another network to the data network corresponding to a preset network slice, in response to a change of the network slice information to the network slice information corresponding to the preset network slice.

The means for terminal devices to access the Internet can be generally achieved by the Wi-Fi or data network. Wi-Fi refers to the wireless connection through hotspots within the range via which terminal device accesses the network, and the network of hotspots can be a wired connection or a wireless connection. The hotspots accessed by Wi-Fi network can be routers, wireless AP (Access Point) or other hotspots, etc. Data network, or cellular network, refers to the network provided by operators, through cells of a base station to access the network.

Network Slice technique has been widely applied under the 5G network. Network slicing is an on-demand networking method, which allows operators to separate several virtual end-to-end networks on an individual infrastructure, and each network slice is logically isolated from the radio access network bearer network to the core network to adapt to various types of applications. A network slice may include at least three parts, a wireless network sub-slice, a bearer network sub-slice, and a core network sub-slice. Customized processing of terminal network services can be realized by means of the network slicing technique, which can be flexibly applied to various scenarios of terminal devices.

A terminal device is allowed to access the Internet at least through the Wi-Fi network or through the data network. In some cases, the terminal device can access the Internet through several Wi-Fi networks together with data networks at the same time. And if both Wi-Fi networks and data networks are enabled, Wi-Fi networks have higher default priority than data networks.

The current network slice information of the terminal device is monitored. The network slice information reflects the network slice corresponding to the data network accessed by the terminal device, which can be an ordinary network slice or a preset network slice. The preset network slice refers to the targeted services subscribed by the user, which can be customized services for regions or customized services for the time. The network slice corresponding to the customized service is called a preset network slice. The preset network slicing environment tends to provide better network connection speed and lower network delay, in short, the network connection is better.

When monitoring the network slice information corresponding to the current default DNN of the terminal, if the monitored network slice information is changed to the network slice information corresponding to the preset network slice, then the current default network of the terminal device can be switched from another network to the data network corresponding to the preset network slice.

The monitored network slice information changes to the network slice information corresponding to the preset network slice, indicating that the current environment of the terminal device is in the environment corresponding to the preset network slice, and a better network connection can be experienced through the data network corresponding to the preset network slice. The current default network of the terminal device refers to the network through which the terminal device accesses the Internet. Another network refers to Wi-Fi networks, or data networks corresponding to another communication card of a dual-SIM card terminal device or a multi-SIM card terminal device, all of which can be switched to data networks corresponding to preset network slices. Some possible application scenarios are provided as follows.

Scenario One

Users often take the subway, and the subway and even the high-speed rail provide free Wi-Fi access. However, in some places, the flow of people is very large, so the number of Wi-Fi users is too large, which leads to limited speed of access which is far less than that of the data network. In these positions, if a user subscribes to the exclusive service, that is, the user has a preset network slice, the default network of the terminal device at this time can be switched to the data network corresponding to the preset network slice, so as to improve the user experience.

Scenario Two

Users access deployed Wi-Fi networks in railway stations or airports. Similarly, a large number of users access Wi-Fi networks in waiting rooms and lounges, which leads to poor-quality of Wi-Fi networks. If a user subscribes to a better location-based preset network of slicing exclusive service, when the user reaches the exclusive area corresponding to the preset network slice, the default network of the terminal device at this time can be switched to the data network corresponding to the preset network slice to improve the user experience.

In some embodiments, before monitoring the current network slice information of the terminal device, the method further includes the following operations.

UE route selection policy (URSP) rule update information sent by the network side is received. The URSP rule update information includes network slice information corresponding to the preset network slice corresponding to the terminal device Data Network Name (DNN). If the terminal device enters the area corresponding to the preset network slice, that is, the area where the service subscribed by the user is located, the network side will automatically send the URSP to the terminal device, which carries the network slice information corresponding to the preset network slice. The network slice information corresponding to the preset network slice can be provided to the terminal device, such that the terminal device can adjust the corresponding network connection rules, including switching the network slice information corresponding to the default DNN of the terminal device to the network slice information corresponding to the preset network slice.

In some embodiments, after receiving the URSP rule update information from the network side, the method further includes the following operation. The network slice information corresponding to the preset network slice is stored.

In some embodiments, switching the current default network of the terminal device from another network to the data network corresponding to the preset network slice includes the following operation.

Switching the Wi-Fi network directly to the data network. This switching is directly performed by the terminal device. That is to say, upon being within the network environment corresponding to the preset network slice, the terminal device directly switches the default network from the connected Wi-Fi network to the data network corresponding to the preset network slice to access the Internet without the user's confirmation. This process is generally imperceptible to users, and users will only realize that the network environment has been improved after switching. This method of switching is more efficient.

In some embodiments, switching the current default network of the terminal device from another network to the data network corresponding to the preset network slice further includes the following operations.

Initiating prompt information corresponding to accessing the data network.

Receiving an operation instruction directed to the prompt information.

Switching the current default network of the terminal device to the data network based on the operation instruction. In addition to directly performing switching, the terminal device can also perform switching in response to the operation of the user. That is to say, if it is monitored that the terminal device is positioned within the network environment corresponding to the preset network slice, prompt information corresponding to the access of the data network can be generated on the terminal device and prompt to the user. The prompt information can be directly or indirectly sensed by the user. In some implementations, the prompt information can be displayed directly on the screen of the terminal device through pop-ups, status bars, short messages, or the like. Alternatively, the prompt information can be converted into specific audio signals and played through the audio equipment of the terminal device. Alternatively, the prompt information can trigger the vibration motor of the terminal device with a vibration of a specific frequency, such that the user is prompt. The purpose of prompting is to inform the user. When the user is informed that the current network environment is in the network environment corresponding to the preset network slice, the user can input the corresponding operation instruction to the terminal device through the prompt information. Then the terminal device switches the default network of the terminal device to the data network corresponding to the preset network slice according to the operation instruction. It is apparent that, the user, when considering the factors such as traffic limit and necessity, may not switch to the data network corresponding to the preset network slice, but continue to maintain the current access to the default network, so the user does not send the operation instruction in that case.

In some embodiments, switching the current default network of the terminal device to the data network corresponding to the preset network slice includes the following operation.

Increasing the access priority of the data network, so that the access priority of the data network is greater than that of the Wi-Fi network. Generally, the priority of the Wi-Fi network will be higher than that of the data network. The priorities can be identified by the score set for each network access. For example, the score of the Wi-Fi network is 60 points, the score of the data network corresponding to the main card of a dual-card mobile phone is 50 points, and the score of the data network corresponding to the secondary card is 45 points. In an embodiment of the present disclosure, if it is detected that the device is in the network environment corresponding to the preset network slice, the score of the corresponding data network can be increased, for example, by 20 points, so that the priority reaches 70 points or 65 points, which is higher than the score of the Wi-Fi network, thereby realizing the switching of the default network to the data network.

In some embodiments, before switching the current default network of the terminal device to the data network corresponding to the preset network slice, the method further includes the following operations.

Initiating a protocol data unit (PDU) Session, and establishing a preset network slice.

Including the preset network slice into the network connection management.

Through the method for network switching according to this embodiment, the terminal device is allowed to access the Internet at least through the Wi-Fi network. The current network slice information of a terminal device is monitored. And, a default network of the terminal device is switched from another network to the data network corresponding to a preset network slice, in response to a change of the network slice information to the network slice information corresponding to the preset network slice. As such, in an embodiment of the present disclosure, network monitoring is performed via the network slice information. The default network of the terminal device is switched to the data network corresponding to the preset network slice, when the current network slice information corresponds to the preset network slice. Thereby the network connection is enhanced, and the user experience is improved accordingly.

Embodiment Two

Figure 2:
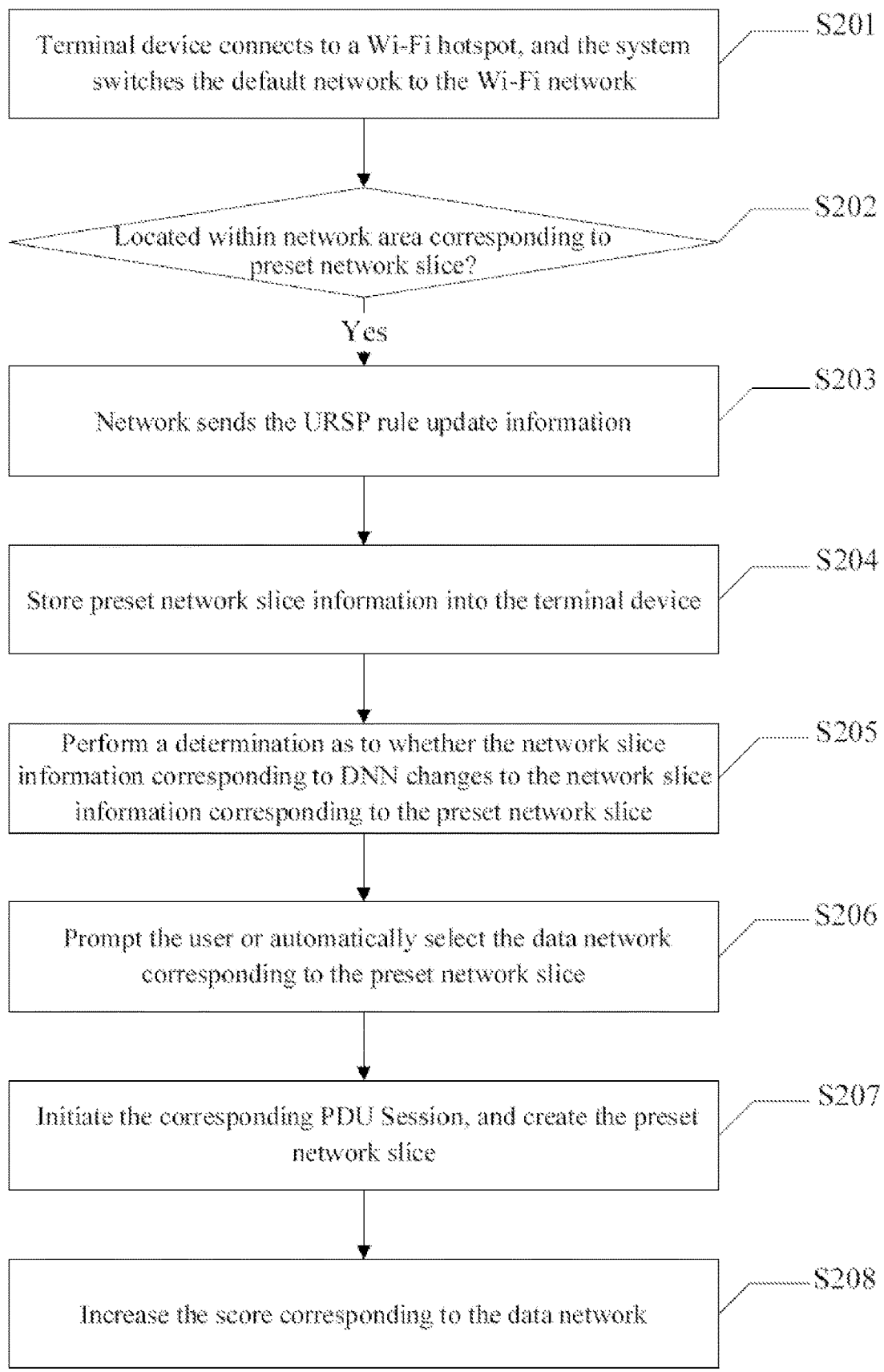
FIG. 2 depicts a flowchart showing a method for network switching according to an embodiment of the present disclosure.

This embodiment provides a method for network switching. Referring to FIG. 2, the method includes the following operations.

At S201, a terminal device connects to a Wi-Fi hotspot, and the system switches the default network to the Wi-Fi network.

At S202, a determination is performed as to whether the terminal device is located within the network area corresponding to the preset network slice, and in response to a negative determination, the method terminates; and in response to a positive determination, the method proceeds to S203.

At S203: the network sends the URSP rule update information, which includes the network slice information corresponding to the preset network slice corresponding to the default DNN of the terminal device.

At S204, a change of network slice information is detected, and the preset network slice information is stored in the terminal device.

At S205, a determination is performed as to whether the network slice information corresponding to the default DNN changes to the network slice information corresponding to the preset network slice, and a network switching is ready in response to a positive determination.

At S206, the user is prompted or the data network corresponding to the preset network slice is automatically selected.

At S207, the corresponding PDU Session is initiated, and the preset network slice is created and included in network connection management.

At S208, the score corresponding to the data network is increased such that the score is higher than that of the Wi-Fi network, so as to switch the default network of the system from Wi-Fi to the data network.

Embodiment Three

Figure 3:
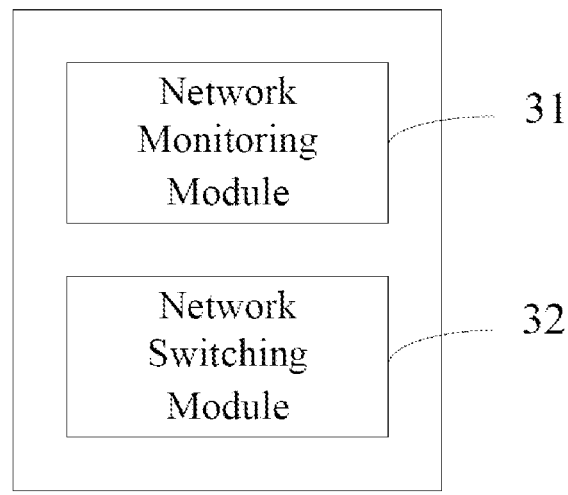
FIG. 3 depicts a schematic diagram showing a device for network switching according to an embodiment of the present disclosure.

This embodiment provides a device for network switching. Referring to FIG. 3, the device includes the following.

A network monitoring module 31, which is configured to monitor a current network slice information of a terminal device.

A network switching module 32, which is configured to switch the current default network of the terminal device from another network to the data network corresponding to the preset network slice in response to a change of the network slice information to the network slice information corresponding to a preset network slice.

The means for terminal devices to access the Internet can be generally achieved by the Wi-Fi or data network. Wi-Fi refers to the wireless connection through hotspots within the range via which the terminal device accesses the network, and the network of hotspots can be a wired connection or a wireless connection. The hotspots accessed by a Wi-Fi network can be routers, wireless AP (Access Point) or other hotspots, etc. Data network, or cellular network, refers to the network provided by operators, through cells of a base station to access the network.

The network Slice technique has been widely applied under the 5G network. Network slicing is an on-demand networking method, which allows operators to separate several virtual end-to-end networks on an individual infrastructure, and each network slice is logically isolated from the radio access network bearer network to the core network to adapt to various types of applications. A network slice may include at least three parts, a wireless network sub-slice, a bearer network sub-slice and a core network sub-slice. Customized processing of terminal network services can be realized by means of the network slicing technique, which can be flexibly applied to various scenarios of the terminal devices.

In this embodiment, the terminal device can at least access the Internet through the Wi-Fi network, and can also access the Internet through the data network at the same time. In some cases, the terminal device can access the Internet through several Wi-Fi networks together with data networks at the same time. And if both Wi-Fi networks and data networks are enabled, Wi-Fi networks have higher default priority than data networks.

The current network slice information of the terminal device is monitored. The network slice information reflects the network slice corresponding to the data network accessed by the terminal device, which can be an ordinary network slice or a preset network slice. The preset network slice refers to the targeted services subscribed by the user, which can be customized services for regions or customized services for the time. The network slice corresponding to the customized service is called a preset network slice. The preset network slicing environment tends to provide better network connection speed and lower network delay, in short, the network connection is better.

When monitoring the network slice information corresponding to the current default DNN of the terminal, if the monitored network slice information is changed to the network slice information corresponding to the preset network slice, then the current default network of the terminal device can be switched to the data network corresponding to the preset network slice. The monitored network slice information changes to the network slice information corresponding to the preset network slice, indicating that the current environment of the terminal device is in the environment corresponding to the preset network slice, and a better network connection can be experienced through the data network corresponding to the preset network slice. The current default network of the terminal device refers to the network through which the terminal device accesses the Internet. Another network refers to Wi-Fi networks, or data networks corresponding to another communication card of a dual-SIM card terminal device or a multi-SIM card terminal device, all of which can be switched to data networks corresponding to preset network slices.

In some embodiments, before monitoring the current network slice information of the terminal device, the method further includes the following operations.

UE route selection policy (URSP) rule update information sent by the network side is received. The URSP rule update information includes network slice information corresponding to the preset network slice corresponding to the DNN of the terminal device. If the terminal device enters the area corresponding to the preset network slice, that is, the area where the service subscribed by the user is located, the network side will automatically send the URSP to the terminal device, which carries the network slice information corresponding to the preset network slice. The network slice information corresponding to the preset network slice can be provided to the terminal device, such that the terminal device can adjust the corresponding network connection rules, including switching the network slice information corresponding to the default DNN of the terminal device to the network slice information corresponding to the preset network slice.

In some embodiments, after receiving the URSP rule update information from the network side, the method further includes the following operation.

The network slice information corresponding to the preset network slice is stored.

In some embodiments, switching the current default network of the terminal device from another network to the data network corresponding to the preset network slice includes the following operation.

Switching the Wi-Fi network directly to the data network.

This switching is directly performed by the terminal device. That is to say, upon being within the network environment corresponding to the preset network slice, the terminal device directly switches the default network from the connected Wi-Fi network to the data network corresponding to the preset network slice to access the Internet. This process is generally imperceptible to users, and users will only realize that the network environment has been improved after switching.

In some embodiments, switching the current default network of the terminal device from another network to the data network corresponding to the preset network slice further includes the following operation.

Generating prompt information corresponding to accessing of the data network on the terminal device.

Receiving an operation instruction directed to the prompt information.

Switching the current default network of the terminal device to the data network based on the operation instruction.

In addition to directly performing switching, the terminal device can also perform switching in response to the operation of the user. That is to say, if it is monitored that the terminal device is positioned within the network environment corresponding to the preset network slice, prompt information corresponding to the access of the data network can be generated on the terminal device. The prompt information can be directly or indirectly sensed by the user. In some implementations, the prompt information can be displayed directly on the screen of the terminal device through pop-ups, status bars, short messages, or the like. Alternatively, the prompt information can be converted into specific audio signals and played through the audio equipment of the terminal device. Alternatively, the prompt information can trigger the vibration motor of the terminal device with a vibration of a specific frequency, such that the user is prompt. The purpose of prompting is to inform the user. When the user is informed that the current network environment is in the network environment corresponding to the preset network slice, the user can input the corresponding operation instruction to the terminal device through the prompt information. Then the terminal device switches the default network of the terminal device to the data network corresponding to the preset network slice according to the operation instruction. It is apparent that, the user may not switch to the data network and does not send the operation instruction in that case.

In some embodiments, switching the current default network of the terminal device from another network to the data network corresponding to the preset network slice includes the following operation.

Increasing the access priority of the data network, so that the access priority of the data network is greater than that of the Wi-Fi network. Generally, the priority of the Wi-Fi network will be higher than that of the data network. The priorities can be identified by the score set for each network access. For example, the score of the Wi-Fi network is 60 points, the score of the data network corresponding to the main card of a dual-card mobile phone is 50 points, and the score of the data network corresponding to the secondary card is 45 points. In an embodiment of the present disclosure, if it is detected that the device is in the network environment corresponding to the preset network slice, the score of the corresponding data network can be increased, for example, by 20 points, so that the priority reaches 70 points or 65 points, which is higher than the score of the Wi-Fi network, thereby realizing the switching of the default network to the data network.

In some embodiments, before switching the current default network of the terminal device to the data network corresponding to the preset network slice from another network, the method further includes the following operations.

Initiating a PDU Session, and establishing a preset network slice.

Including the preset network slice into the network connection management.

Through the device for network switching according to this embodiment, the terminal device is allowed to access the Internet at least through the Wi-Fi network. The current network slice information of a terminal device is monitored. And, a default network of the terminal device is switched to the data network corresponding to a preset network slice, in response to a change of the network slice information to the network slice information corresponding to the preset network slice. As such, in an embodiment of the present disclosure, network monitoring is performed via the network slice information. The default network of the terminal device is switched to the data network corresponding to the preset network slice, when the current network slice information corresponds to the preset network slice. Thereby the network connection is enhanced, and the user experience is improved accordingly.

Embodiment Four

Figure 4:
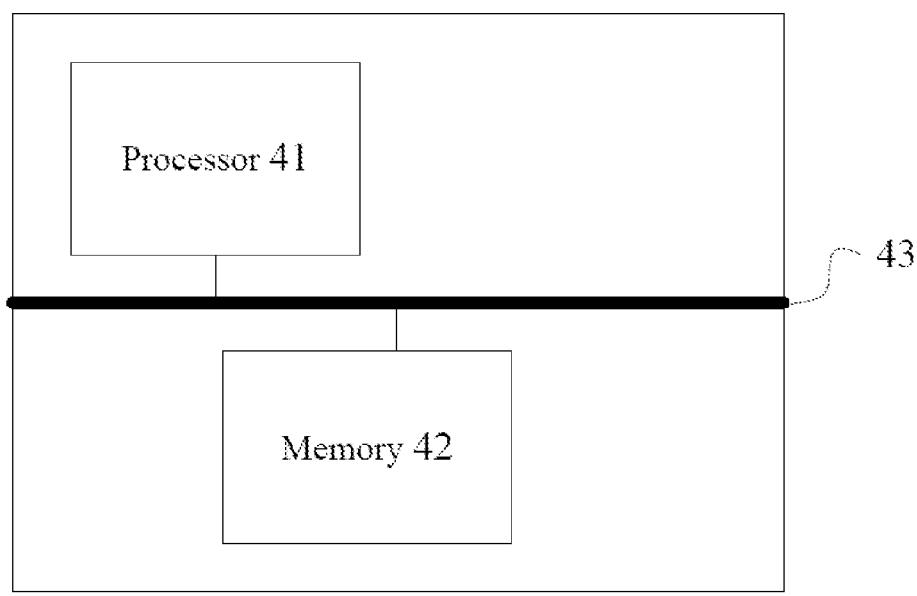
FIG. 4 depicts a schematic diagram showing a terminal device according to an embodiment of the present disclosure.

This embodiment provides a terminal device. Referring to FIG. 4, the terminal device includes a processor 41, a memory 42 and a communication bus 43.

The communication bus 43 is configured to implement the connection and communication between processor 41 and memory 42.

The memory 42 stores at least one computer program which, when executed by the processor 41, causes the processor to carry out any one of the methods as described in the above embodiments, which will not be repeated here.

This embodiment further provides a computer-readable storage medium, which includes volatile or nonvolatile, removable or non-removable media implemented in any method or technology for storing information such as computer-readable instructions, data structures, computer program modules or other data. Computer-readable storage media include, but are not limited to, RAM (Random Access Memory), ROM (Read-Only Memory), EEPROM (Electrically Erasable Programmable Read Only Memory), Erasable programmable read-only memory), flash memory or other memory technologies, CD-ROM (compact disc read-only memory), digital versatile disc (DVD) or other optical disc storage, magnetic box, magnetic tape, magnetic disc storage or other magnetic storage devices, or any other medium that can be used to store desired information and can be accessed by a computer.

The computer-readable storage medium according to this embodiment may be configured to store at least one computer program executable by a processor, which when executed by the processor, causes the processor to carry out any one of the methods as described in the above embodiments.

This embodiment also provides a computer program (or computer software), which can be distributed on a computer-readable medium and executed by a computing device to perform the operations of the method for network switching in any one of the above embodiments. And in some cases, at least one operation shown or described may be performed in a different order than that described in the above embodiments.

This embodiment further provides a computer program product, which includes a computer-readable device, and the computer program described above is stored on the computer-readable device. The computer-readable device in this embodiment includes the computer-readable storage medium as described above.

According to the method and device for network switching, the terminal device and storage medium in some embodiments of the present disclosure, the network slice information corresponding to the current DNN of a terminal device is monitored. And, a default network of the terminal device is switched from another network to the data network corresponding to a preset network slice, in response to a change of the network slice information to the network slice information corresponding to the preset network slice. As such, in an embodiment of the present disclosure, network monitoring is performed via the network slice information. The default network of the terminal device is switched to the data network corresponding to the preset network slice, when the current network slice information corresponds to the preset network slice. Thereby the network connection is enhanced, and the user experience is improved accordingly.

It shall be appreciated by a person having ordinary skills in the art that all or some of the steps, systems and functional modules/units in the methods disclosed above can be implemented as software (which can be implemented by computer program codes executable by computing devices), firmware, hardware and appropriate combinations thereof. In the hardware implementation, the division between functional modules/units mentioned in the above description does not necessarily correspond to the division of physical components. For example, a physical component can have multiple functions, or a function or step can be performed by several physical components in cooperation. Some or all physical components can be implemented as software executed by a processor, such as a central processing unit, a digital signal processor or a microprocessor, or as hardware, or as an integrated circuit, such as an application-specific integrated circuit.

Furthermore, it is well known to a person having ordinary skills in the art that communication media usually contain computer-readable instructions, data structures, computer program modules or other data in modulated data signals such as carrier waves or other transmission mechanisms, and can include any information delivery media. Therefore, the present disclosure is not limited to any specific combination of hardware and software.

The above content is a description of some embodiments of the present disclosure. However, the present disclosure is not limited thereto. For a person having ordinary skills in the art to which the present disclosure belongs, various simple deductions or alternations can be made without departing from the concept of the present disclosure, all of which should be regarded as falling within the scope of the present disclosure.

What is claimed is:

1. A method for network switching, comprising:
monitoring current network slice information of a terminal device; and
switching a current default network of the terminal device from another network to a data network corresponding to a preset network slice, in response to a change of the network slice information to network slice information corresponding to the preset network slice;
wherein, the preset network slice corresponds to a customized service.

2. The method of claim 1, wherein prior to monitoring current network slice information of a terminal device, the method further comprises,
receiving user equipment (UE) route selection policy (URSP) rule update information sent by a network side, wherein, the URSP rule update information comprises network slice information corresponding to the preset network slice corresponding to data network name (DNN) of the terminal device;
wherein, the customized service includes customized service for region or customized service for time.

3. The method of claim 1, wherein subsequent to receiving URSP rule update information sent by a network side, the method further comprises,
storing the network slice information corresponding to the preset network slice.

4. The method of claim 1, wherein switching a current default network of the terminal device from another network to a data network corresponding to the preset network slice comprises,
in response to another network being a Wi-Fi network, switching the Wi-Fi network directly to the data network.

5. The method of claim 1, wherein switching a current default network of the terminal device from another network to a data network corresponding to the preset network slice comprises,
initiating prompt information corresponding to accessing the data network;
receiving an operation instruction directed to the prompt information; and
switching the current default network of the terminal device to the data network based on the operation instruction.

6. The method of claim 1, wherein switching a current default network of the terminal device from another network to a data network corresponding to the preset network slice comprises,
increasing an access priority of the data network, such that the access priority of data network is greater than that of Wi-Fi network.

7. The method of claim 1, wherein prior to switching a current default network of the terminal device from another network to a data network corresponding to the preset network slice, the method further comprises,
initiating a protocol data unit (PDU) Session, and establishing the preset network slice; and
including the preset network slice in network connection management.

8. The method of claim 2, wherein switching a current default network of the terminal device from another network to a data network corresponding to the preset network slice comprises,
in response to another network being a Wi-Fi network, switching the Wi-Fi network directly to the data network.

9. The method of claim 3, wherein switching a current default network of the terminal device from another network to a data network corresponding to the preset network slice comprises,
in response to another network being a Wi-Fi network, switching the Wi-Fi network directly to the data network.

10. The method of claim 2, wherein switching a current default network of the terminal device from another network to a data network corresponding to the preset network slice comprises,
initiating prompt information corresponding to accessing the data network;
receiving an operation instruction directed to the prompt information; and
switching the current default network of the terminal device to the data network based on the operation instruction.

11. The method of claim 3, wherein switching a current default network of the terminal device from another network to a data network corresponding to the preset network slice comprises,
initiating prompt information corresponding to accessing the data network;
receiving an operation instruction directed to the prompt information; and
switching the current default network of the terminal device to the data network based on the operation instruction.

12. The method of claim 2, wherein switching a current default network of the terminal device from another network to a data network corresponding to the preset network slice comprises,
increasing an access priority of the data network, such that the access priority of data network is greater than that of Wi-Fi network.

13. The method of claim 3, wherein switching a current default network of the terminal device from another network to a data network corresponding to the preset network slice comprises,
increasing an access priority of the data network, such that the access priority of data network is greater than that of Wi-Fi network.

14. The method of claim 2, wherein prior to switching a current default network of the terminal device from another network to a data network corresponding to the preset network slice, the method further comprises,
initiating a protocol data unit (PDU) Session, and establishing the preset network slice; and
including the preset network slice in network connection management.

15. The method of claim 3, wherein prior to switching a current default network of the terminal device from another network to a data network corresponding to the preset network slice, the method further comprises,
initiating a protocol data unit (PDU) Session, and establishing the preset network slice; and
including the preset network slice in network connection management.

16. A terminal device, comprising a processor, a memory, and a communication bus;
wherein, the communication bus is configured to implement a connection and communication between the processor and the memory; and
the memory stores at least one computer program executable by the processor which, when executed by the processor, causes the processor to carry out a method for network switching, comprising:

monitoring current network slice information of a terminal device; and switching a current default network of the terminal device from another network to a data network corresponding to a preset network slice, in response to a change of the network slice information to network slice information corresponding to the preset network slice;

wherein, the preset network slice corresponds to a customized service.

17. The terminal device of claim 16, wherein prior to monitoring current network slice information of a terminal device, the method further comprises, receiving user equipment (UE) route selection policy (URSP) rule update information sent by a network side, wherein, the URSP rule update information comprises network slice information corresponding to the preset network slice corresponding to data network name (DNN) of the terminal device.

18. The terminal device of claim 16, wherein subsequent to receiving URSP rule update information sent by a network side, the method further comprises, storing the network slice information corresponding to the preset network slice.

19. A non-transitory computer-readable storage medium storing at least one computer program executable by a processor, which when executed by the processor, causes the processor to carry out a method for network switching, comprising:

monitoring current network slice information of a terminal device; and switching a current default network of the terminal device from another network to a data network corresponding to a preset network slice, in response to a change of the network slice information to network slice information corresponding to the preset network slice;

wherein, the preset network slice corresponds to a customized service.

20. The non-transitory computer-readable storage medium of claim 19, wherein prior to monitoring current network slice information of a terminal device, the method further comprises, receiving user equipment (UE) route selection policy (URSP) rule update information sent by a network side, wherein, the URSP rule update information comprises network slice information corresponding to the preset network slice corresponding to data network name (DNN) of the terminal device.

* * * * *